United States Patent
Levy et al.

(10) Patent No.: US 8,446,376 B2
(45) Date of Patent: May 21, 2013

(54) VISUAL RESPONSE TO TOUCH INPUTS

(75) Inventors: Robert Levy, Seattle, WA (US); Sarah Graham Williams, Seattle, WA (US); Michael Cronin, Sammamish, WA (US); Maxim Mazeev, Redmond, WA (US); Bryan Beatty, Sammamish, WA (US); Daniel Wigdor, Toronto, CA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 12/353,187

(22) Filed: Jan. 13, 2009

(65) Prior Publication Data

US 2010/0177049 A1    Jul. 15, 2010

(51) Int. Cl.
    *G06F 3/045*    (2006.01)
(52) U.S. Cl.
    USPC ............ 345/173; 345/175; 715/700; 715/709
(58) Field of Classification Search
    None
    See application file for complete search history.

(56) References Cited

U.S. PATENT DOCUMENTS

| | | | |
|---|---|---|---|
| 6,243,080 B1 | 6/2001 | Molne | |
| 7,088,346 B2 | 8/2006 | Krajewski et al. | |
| 7,184,064 B2 | 2/2007 | Zimmerman et al. | |
| 7,385,593 B2 | 6/2008 | Krajewski et al. | |
| 2005/0130738 A1 | 6/2005 | Miyamoto et al. | |
| 2006/0022955 A1* | 2/2006 | Kennedy | 345/173 |
| 2006/0071914 A1 | 4/2006 | Kuroume et al. | |
| 2006/0132460 A1* | 6/2006 | Kolmykov-Zotov et al. | 345/173 |
| 2007/0024597 A1* | 2/2007 | Matsuoka | 345/173 |
| 2007/0052687 A1 | 3/2007 | Terada | |
| 2007/0057925 A1 | 3/2007 | Hung | |
| 2007/0094620 A1* | 4/2007 | Park | 715/862 |
| 2007/0139394 A1 | 6/2007 | Weng | |
| 2007/0146336 A1* | 6/2007 | Ording et al. | 345/173 |
| 2007/0273666 A1* | 11/2007 | Shin et al. | 345/173 |
| 2008/0088593 A1 | 4/2008 | Smoot | |
| 2008/0204427 A1* | 8/2008 | Heesemans et al. | 345/174 |
| 2009/0073128 A1* | 3/2009 | Marsden | 345/168 |
| 2009/0140995 A1* | 6/2009 | Kang | 345/173 |
| 2010/0083109 A1* | 4/2010 | Tse et al. | 715/702 |
| 2010/0164879 A1* | 7/2010 | Doktorova et al. | 345/173 |

OTHER PUBLICATIONS

Moscovich Tomer,"Principles and Applications of Multi-touch Interaction", retrieved at<<http://www.cs.brown.edu/~tm/papers/moscovich_dissertation.pdf>>, May 2007 , pp. 114.

(Continued)

*Primary Examiner* — Lixi C Simpson
(74) *Attorney, Agent, or Firm* — Alleman Hall McCoy Russell & Tuttle LLP (57) ABSTRACT

The provision of visual responses to touch inputs is disclosed. For example, one disclosed embodiment provides a computing device comprising a touch-sensitive display, a processor in operative communication with the touch-sensitive display, and memory comprising instructions stored thereon that are executable by the processor to detect a touch input made via the touch-sensitive display, display on the touch-sensitive display a first visual response to the touch input indicating that the touch input was detected by the computing device, and if the touch input is made in a touch-interactive area on the touch-sensitive display, then to display a second visual response to the touch input indicating that the touch was made in the touch-interactive area of the display.

18 Claims, 4 Drawing Sheets

OTHER PUBLICATIONS

Shahzad Malik, "An Exploration of Multi-Finger Interaction on Multi-Touch Surfaces", retrieved at<<http://www.cs.utoronto.ca/~smalik/clownloads/malik_2007_thesis_multi_finger_final.pdf>>, 2007, pp. 184.

Jack, "AU Optronics Unveils 0.69mm Ultra-Thin Mobile Device Panel", retrieved at<<http://techluver.com/category/lcd-panels/page/2/>>, Nov. 2, 2007, pp. 31.

* cited by examiner

VISUAL RESPONSE TO TOUCH INPUTS

BACKGROUND

Touch-sensitive displays are configured to accept inputs in the form of touches, and in some cases near-touches, made on a surface of the display. Touch-sensitive displays may use various mechanisms to detect touches, including but not limited to optical, resistive, and capacitive mechanisms. Further, some touch-sensitive displays may be configured to detect a plurality of temporally overlapping touches. These displays, which may be referred to as multi-touch displays, may allow for a greater range of input touches and gestures than a display configured to accept only a single touch at a time.

Some computing devices that utilize multi-touch displays may omit a mechanical keyboard, mouse, or other such user input device, and instead utilize touch as a primary input mode for user interaction with the device. However, without the combination of visual and haptic feedback provided by such mechanical input devices, it may be difficult for a user to determine if a touch input is made properly via such a touch-sensitive display.

SUMMARY

Various embodiments are disclosed herein that relate to providing visual responses to touch inputs. For example, one disclosed embodiment provides a computing device comprising a touch-sensitive display, a processor in operative communication with the touch-sensitive display, and memory comprising instructions stored thereon that are executable by the processor to detect a touch input made via the touch-sensitive display, display on the touch-sensitive display a first visual response to the touch input indicating that the touch input was detected by the computing device, and if the touch input is made in a touch-interactive area of the display, then to display a second visual response to the touch input indicating that the touch was made in the touch-interactive area of the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present disclosure is directed to the provision of visual feedback in response to touch inputs on a touch-sensitive display in such a manner that a visual response is displayed for any touch made on the touch-sensitive display during normal operation. As described in more detail below, the disclosed embodiments may help a user of a touch-sensitive display to confirm that a touch input is detected by hardware, and also to confirm that touch input is received and/or correctly interpreted by software with which the user is interacting. Further, the disclosed embodiments also may help to illustrate the occurrence of inadvertent touches so that the user can see the source of any unintended inputs that cause unexpected actions to occur on a computing device.

Prior to discussing the provision of visual feedback to touch inputs, an example use environment is described with reference to FIG. 1, which shows an embodiment of a computing device in the form of an interactive display device 100 with a horizontal touch-sensitive display. The interactive display device 100 comprises a projection display system having an image source 102, optionally one or more mirrors 104 for increasing an optical path length and image size of the projection display, and a horizontal display screen 106 onto which images are projected. While shown in the context of a projection display system, it will be understood that an interactive display device may comprise any other suitable image display system, including but not limited to liquid crystal display panel systems and other light valve systems. Further, while shown in the context of a horizontal display system, it will be understood that the disclosed embodiments may be used in displays of any orientation.

The display screen 106 includes a clear, transparent portion 108, such as sheet of glass, and a diffuser screen layer 110 disposed on top of the clear, transparent portion 108. In some embodiments, an additional transparent layer (not shown) may be disposed over the diffuser screen layer 110 to provide a smooth look and feel to the display screen.

Figure 1:
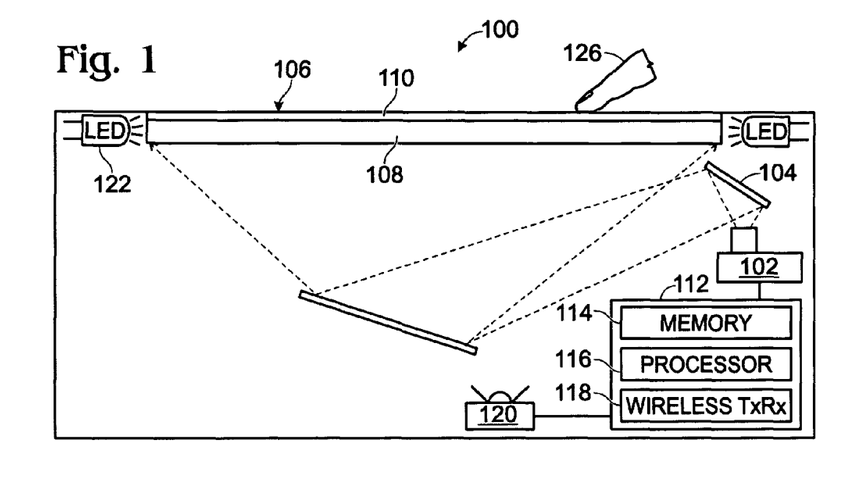
FIG. 1 shows an embodiment of a computing device comprising a touch-sensitive display.

Continuing with FIG. 1, the interactive display device 100 further includes an electronic controller 112 comprising memory 114 and a processor 116. The controller 112 also may include a wireless transmitter and receiver 118 configured to communicate with other devices. The controller 112 may include computer-executable instructions or code, such as programs, stored in memory 114 or on other computer-readable storage media and executed by processor 116, that control the various visual responses to detected touches described in more detail below. Generally, programs include routines, objects, components, data structures, and the like that perform particular tasks or implement particular abstract data types. The term "program" as used herein may connote a single program or multiple programs acting in concert, and may be used to denote applications, services, or any other type or class of program.

To sense objects located on the display screen 106, the interactive display device 100 includes one or more image capture devices 120 configured to capture an image of the entire backside of the display screen 106, and to provide the image to the electronic controller 112 for the detection objects appearing in the image. The diffuser screen layer 110 helps to avoid the imaging of objects that are not in contact with or positioned within a few millimeters of the display screen 106, and therefore helps to ensure that only objects that are touching the display screen 106 (or, in some cases, in close proximity to the display screen 106) are detected by the image capture device 120. While the depicted embodiment includes a single image capture device 120, it will be understood that any suitable number of image capture devices may be used to image the backside of the display screen 106. Further, it will be understood that the term "touch" as used herein may comprise both physical touches, and/or "near touches" of objects in close proximity to the display screen The image capture device 120 may include any suitable image sensing mechanism. Examples of suitable image sensing mechanisms include but are not limited to CCD and CMOS image sensors. Further, the image sensing mechanisms may capture images of the display screen 106 at a sufficient frequency or frame rate to detect motion of an object across the display screen 106 at desired rates. In other embodiments, a scanning laser may be used in combination with a suitable photodetector to acquire images of the display screen 106.

The image capture device 120 may be configured to detect reflected or emitted energy of any suitable wavelength, including but not limited to infrared and visible wavelengths. To assist in detecting objects placed on the display screen 106, the image capture device 120 may further include an additional light source 122 such as one or more light emitting diodes (LEDs) configured to produce infrared or visible light. Light from the light source 122 may be reflected by objects placed on the display screen 122 and then detected by the image capture device 120. The use of infrared LEDs as opposed to visible LEDs may help to avoid washing out the appearance of projected images on the display screen 106.

FIG. 1 also depicts a finger 126 of a user's hand touching the display screen. While the embodiments herein are described in the context of a user's finger touching a touch-sensitive display, it will be understood that the concepts may extend to the detection of a touch of any other suitable physical object on the display screen 106, including but not limited to a stylus, cell phones, smart phones, cameras, PDAs, media players, other portable electronic items, bar codes and other optically readable tags, etc. Further, while disclosed in the context of an optical touch sensing mechanism, it will be understood that the concepts disclosed herein may be used with any suitable touch-sensing mechanism. The term "touch-sensitive display" is used herein to describe not only the display screen 106, light source 122 and image capture device 120 of the depicted embodiment, but to any other suitable display screen and associated touch-sensing mechanisms and systems, including but not limited to capacitive and resistive touch-sensing mechanisms.

In some cases, a user's touch input may not map to the expected output due to problems with the input. Such problems may arise from various sources. For example, in a multi-touch display system, a user might put two fingers down onto an object displayed on the touch-sensitive display anticipating a particular response, but instead another response is presented, or no response at all. With a lack of feedback provided by the touch-sensitive display, it may be difficult to tell if the hardware failed to detect the touch, if the user's finger missed the target location, if the user was mistaken about the anticipated response, whether an accidental activation occurred elsewhere on the device that changed the state of the object, or whether the object is not configured for touch interaction. Where these input problems are not visually distinguished from one another, a user may be provided ambiguous feedback that may lead to a disconnection from the system.

A user's finger may miss a target touch location for various reasons. For example, in some situations, a user's finger may obscure a small target location, and therefore make it difficult to touch the correct location precisely. Likewise, where a user contacts a touch-sensitive display with a large area of a finger, the reduction of the touch area to an arbitrary point may cause users to miss targets that they are physically touching.

Likewise, multi-touch devices may have multiple touch states that may be difficult to anticipate or distinguish during use. For example, some multi-touch devices may support operations such as a one-finger rotate and translate, a two-finger rotate/translate/scale, etc. Where more than two contacts are made, the direct-touch paradigm of interaction may be broken, and content may no longer respond to input gestures. This may lead to user confusion where no visual feedback is provided.

In multi-touch systems, and particularly in systems with a horizontally oriented multi-touch display, accidental activations may occur relatively frequently. Where accidental activations occur, users may be able to observe only the consequence of the accidental activation on the application. Without visual feedback, therefore may be difficult for the users to determine the cause of such activations, and therefore to learn to avoid them.

Further, applications may include elements that are not intended to respond to touch. Such elements include, but are not limited to, deactivated controls, background images, etc. These elements are therefore another state that may provide no response to a user's touch input, and that may therefore lead to confusion without visual feedback to a touch.

In light of these potential problems and others with erroneous touch inputs, the interactive display device 100 may be configured to display various visual responses to a touch input to communicate specific information about the touch input to a user. For example, a first visual response may be displayed to communicate to a user that a touch is detected by the touch-sensitive display hardware of the interactive display device, irrespective of whether the touch is made over an area of the display on which a touch-enabled user interface control of an application is available. Likewise, a second visual response may be displayed to inform a user that a touch input is detected in a touch-interactive area of the display by an application running on a touch-sensitive device.

In some embodiments, different visual responses also may be used to indicate whether a touch is "captured" by a touch-enabled control or not "captured" by the control (i.e. the touch is "uncaptured"). The term "capture" and variants thereof may refer to a manner in which a system associates a touch input with a touch-enabled control. For example, in the case of a touch input made over a user interface element (e.g. a control), a single touch may be delivered to the element over which the touch is made. If the element is interested in processing that touch, the element can "capture" it so that all later events with the physical object that made the touch are redirected to the element that captured the object. In this case, the touch is "captured." If no elements are interested in the touch input, the touch may stay "uncaptured." An example of an uncaptured touch is the above-described large-area touch in which the point of contact is determined to be outside of the active area of the touch-enabled control, even if the user's finger is touching the control.

Further, in yet other embodiments, a visual response may be used to indicate whether a touch is ignored due to the existence of a constraint. For example, a visual response may be used to indicate whether a touch on a multi-touch display is "overcaptured", wherein an overcaptured touch is a touch that exceeds a maximum number of touches recognized by a touch-enabled control. Other non-limiting examples of constraints are described below.

In this manner, every touch made on a touch-sensitive display may be visualized to give the user feedback on how the touch was interpreted by the device. Therefore, for each touch, a user can see whether (a) the hardware detected the touch, and whether (b) the touch input was directed to the desired target (i.e. a touch-enabled control). This allows a user to more easily identify the source of a touch input error. Embodiments of these visual responses are described in more detail below.

In some embodiments, these visual responses may be implemented as a platform for the development of software. In this manner, the visual responses to touch inputs may be implemented in a consistent manner for any software running on the platform. This may help users to learn to use the platform more quickly, and also may lower the burden on developers to provide solutions for indicating misplaced touches, etc., via software.

Figure 2:
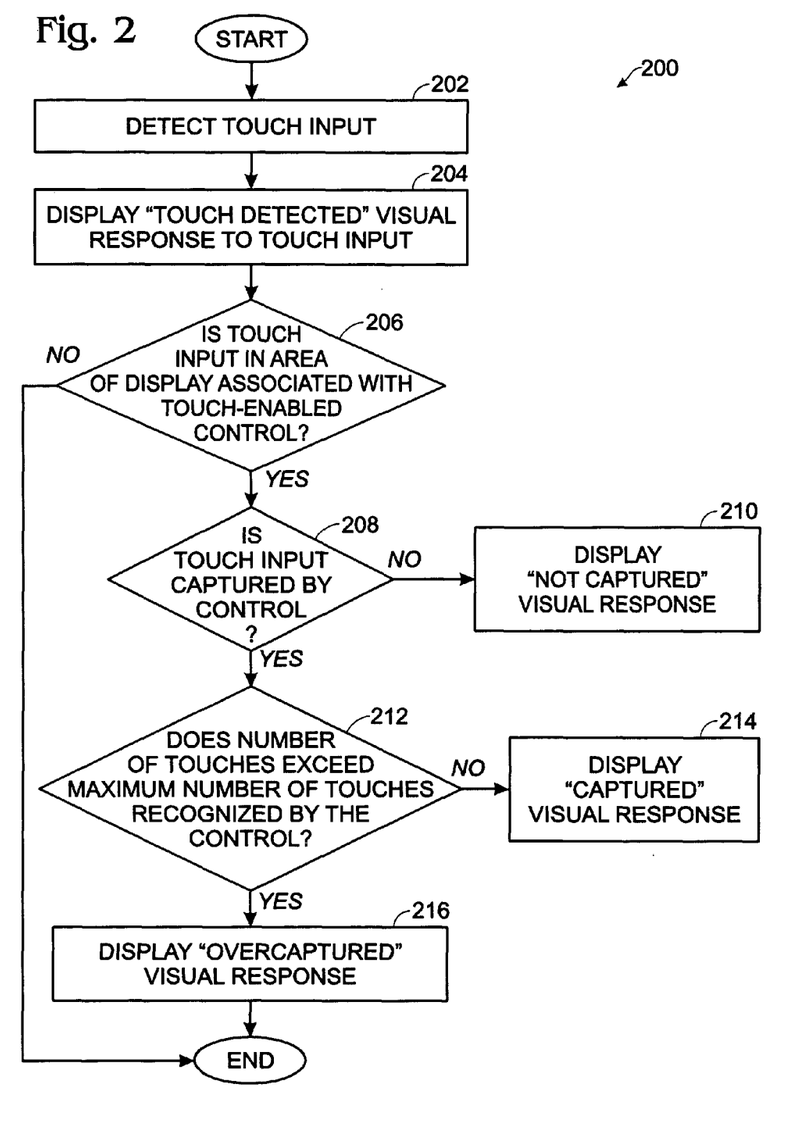
FIG. 2 shows an embodiment of method of providing visual responses to touch inputs on a touch-sensitive display.
Figure 3:
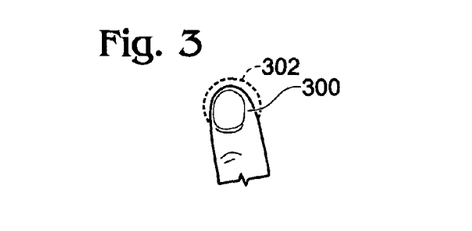
FIG. 3 shows an embodiment of a first visual response to a detected touch that shows a touch input is detected by hardware.

FIG. 2 shows an embodiment of a method 200 for providing visual responses to touch inputs. Method 200 comprises, at 202, detecting a touch input on a touch-sensitive display, and then at 204, displaying a first visual response in the form of a "touch detected" visual response that indicates that the touch was detected by the hardware. The "touch detected" visual response may take any suitable form. For example, in one embodiment, as illustrated in FIG. 3, the "touch detected" visual response 302 may take the form of an illuminated area located beneath the object 300 touching the screen. The illuminated area may create an aural effect viewable by a user around a perimeter of the object 300, thereby informing the user of the detected touch. In this manner, if the "touch detected" visual response is not displayed, the user has information that the hardware failed to detect the touch. It will be noted that the "touch detected" visual response is displayed whether or not the touch input was properly made and captured by an intended control, and any visual responses intended to show an uncaptured/captured/overcaptured touch may be made in addition to the "touch detected" visual response. It will further be understood that this example of a "touch detected" visual response is disclosed for the purpose of example, and is not intended to be limiting in any manner, as any other suitable visual response may be used to indicate a touch detected by hardware.

The use of the "touch detected" visual response also may allow a user to detect a moment at which a touch input occurs. For example, in some touch systems (i.e. optical systems), activation may occur before an object actually touches the display. On the other hand, with some resistive technologies, activation may occur after a degree of pressure is applied to the display. Because no physical sensation accompanies the moment of activation, unlike the haptic feedback offered by the "click" of a mouse or keyboard, it may be difficult for a user to anticipate or know at what point in a touch gesture activation will occur. On the other hand, by displaying the "touch detected" visual response upon activation, a user actually sees the moment of activation, and can learn to anticipate the moment of activation for future touch inputs for any specific device on which method 200 is implemented.

Continuing with FIG. 2, method 200 next comprises, at 206, determining whether the touch input occurs in an area of the touch-sensitive display that is associated with a touch-enabled control. The area associated with the control may be, for example, an area that is within the boundaries of an application window displayed on the display, within the boundaries of a displayed image, over or in proximity to a user interface "button" control (or other type control), etc., and includes touch areas that would result in either a captured or uncaptured touch. Any touch that occurs within an area associated with a touch-enabled control will result in a second visual response that is distinct from the first visual response. In this manner, a user has information that the touch input was made in a touch-interactive area of the display, and detected by the relevant application.

Figure 4:
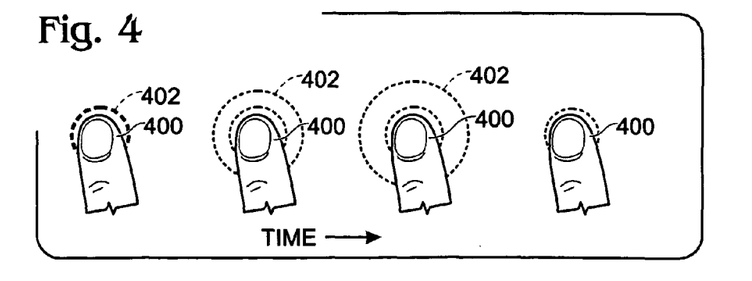
FIG. 4 shows an embodiment of a second visual response to a touch input that shows a touch input is detected by software.
Figure 5:
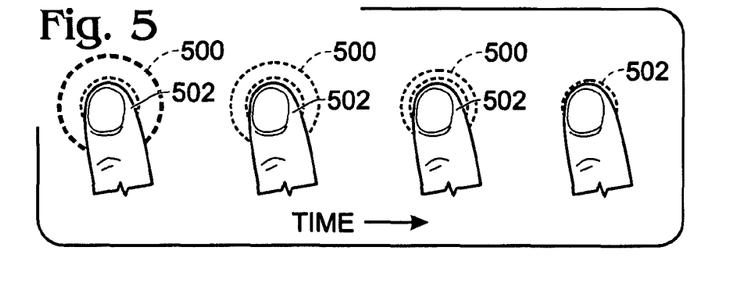
FIG. 5 shows an embodiment of a third visual response to a touch input that shows is detected by software and captured by a touch-enabled user interface control.

In some embodiments, different visual responses may be used to indicate whether a touch is captured or uncaptured (i.e. two distinct "second visual responses" that depend upon capture state). For clarity, the captured and uncaptured visual responses are referred to herein as second and third visual responses that are each distinct from the first, "touch detected" visual response, and that are also distinct from each other. FIGS. 4 and 5 show example embodiments of an "uncaptured" visual response and a "captured" visual response. First referring to FIG. 4, the depicted "uncaptured" visual response comprises a diverging animation 400 that originates at the "touch detected" visual response around the associated object 402 and moves outwardly. Next referring to FIG. 5, the depicted "captured" visual response comprises a converging animation 500 that originates at a location spaced from the "touch detected" visual response and associated object 502, and converges toward the "touch detected" visual response and associated object 502. In some embodiments, the animation may change in intensity as the animation converges/diverges relative to the object. Through the use of different visual responses based upon the capture state, a user may be able to easily determine when an input error is due to a large-area-touch miss or the like.

In the depicted embodiment, the "uncaptured" and "captured" animations respectively comprise an expanding or contracting circle that surrounds the object and "touch detected" visual response, but it will be understood that any other suitable animation may be used, including animations that do not converge/diverge. Further, in other embodiments, other visual responses other than animations may be used. For example, in some embodiments, a first color may be used to show a "captured" state and a second color may be used to show an "uncaptured" touch state. It will be understood that each of these "captured" and "uncaptured" visual response embodiments are described for the purpose of example, and are not intended to be limiting in any manner.

In some situations, a finger or other manipulator that slides off of a user interface control may remain captured by that control until the finger or other manipulator is lifted from the touch-sensitive surface. Therefore, a "captured" visual response may be used to indicate the capture state of a finger or other manipulator that has been moved from over a control. For example, when a user's finger slides on the surface from a location over the control to a location spaced from the control but remains captured by the control, a "captured" graphical element may be displayed in the form of a graphical tether extending between the control and the location of the finger as a visual response to illustrate that the touch remains captured by the control. In this manner, a second user who touches the control while a first user's finger is captured by the control has an indication of why the control is not responding to the second user's touch. In some embodiments, such a tether visual indication may be displayed only when the second user touches the control, while in other embodiments the tether may be displayed anytime a touch is moved from over a control but remains captured by the control. It will be understood that any other suitable visual indicator than a graphical tether may be used to indicate such a capture state.

Visual responses also may be used to indicate the existence of a constraint imposed by a device or application. For example, as mentioned above, in embodiments in which the touch-sensitive display is a multi-touch display, a distinct visual response may be displayed for an overcaptured touch, indicating that a number of detected touches has exceeded a constraint that limits the number of touches recognized by a touch-enabled control. For example, a user may be able to enlarge an image, such as a photograph, by using two fingers to drag the edges or corners of the photograph in a diverging manner. If a user touches the photograph with a third finger, a loss or change in touch functionality may result. Therefore, to help a user see when a touch is overcaptured by a touch-enabled control, a fourth visual response (here, an "overcaptured" visual response) may be displayed when a touch captured by a control is determined to exceed a maximum number of touches recognized by the control.

The "overcaptured" touch is an example of one constraint imposed by a control that may be visualized to provide feedback to a user. Various other types of constraints imposed by a control may be visualized in a similar manner. Examples of such constraints include, but are not limited to, object size constraints, boundary constraints, application-imposed restraints (such as restrictions on rotating of a photograph or other object, disabling of a scrolling of a list, etc.), and the like. For example, in the case of object size restraints, a visualization may be used where a photograph has reached a maximum or minimum size during resizing. Then, any attempt to resize it beyond the maximum or minimum size may result in the display of the "overcaptured" response as described above indicating that the touches are being ignored by the control. As another example of a visual response that may be displayed to indicate the existence of a maximum size constraint, upon reaching a maximum size during a resizing gesture, a photograph stops expanding and, instead, streaks (e.g. like a comet's tail) appear behind the fingers performing the scaling gesture. This indicates to the user that the user's touch is still detected by software and hardware, and thereby indicates the existence of the constraint. A control may indicate the existence of other constraints in a similar manner. Therefore, the "overcaptured" visual response may be considered to be one of any number of such "constraint notification" visual responses that may occur when a touch input is ignored due to a constraint.

Figure 6:
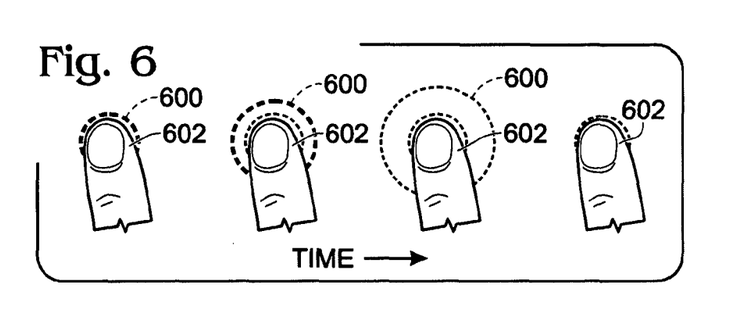
FIG. 6 shows an embodiment of a fourth visual response to a touch input that indicates that the touch exceeds a maximum number of recognized touches for a touch-enabled control.

FIG. 6 shows an example of a "constraint notification" visual response in the context of an "overcaptured" visual response that comprises the display of an animated, diverging circle 600 like that of the "uncaptured" visual response. The "overcaptured" visual response may be displayed only for the finger (or other object) that caused the overcaptured state, or for all fingers captured by the control. In either case, by using similar visual responses to indicate both the uncaptured and overcaptured touch states, a user may learn that the visual response generally indicates a problem with the capture of touches by the control. It will be understood that the depicted example of an "overcaptured" visual response is disclosed for the purpose of example, and that any other visual response, whether animated or unanimated, similar or different to the "uncaptured" visual response, may be used.

Returning to FIG. 2, if it is determined at 206 that the touch input is not in an area of the display associated with a touch-enabled control, then no additional visual response is displayed. On the other hand, if it is determined at 206 that the touch input is in an area associated with a touch-enabled control, then it is determined at 208 whether the touch input is captured by the control.

If the touch input is not captured by the control, then a "not captured" visual response is displayed at 210. On the other hand, if the touch input is captured by the control, then it is determined at 212 whether the number of touches exceeds the maximum number of touches recognized by the control. Where the maximum number of touches is not exceeded, a "captured" visual response is displayed at 214. On the other hand, where a maximum number of touches is exceeded, an "overcaptured" visual response is displayed at 216. In this manner, method 200 shows a user whether a touch is detected by hardware, whether the touch occurs in an area of the display configured to accept touch inputs for an application, and also a capture state of a touch input relative to a touch-enabled control. This may enable a user to determine the source of an error in an unsuccessful touch input, and also may provide a consistent, intuitive interaction paradigm that helps users learn to use a touch-sensitive device.

In some embodiments, other types of visual responses may be provided to touch inputs in various specific circumstances. For example, due to touch detection system latency, when an object is moved across a touch-sensitive display, a "touch detected" visual response may lag behind the object during the movement. In this case, animation may be used to move a "touch detected" visual response across a display in a manner that reduces the visual impact of the lag. Further, when a user's touch misses a target location (for example, in the large-area touch example described above), the "touch detected" response may remain displayed for a period of time after the user lifts the finger (or other object) from the display.

Figure 7:
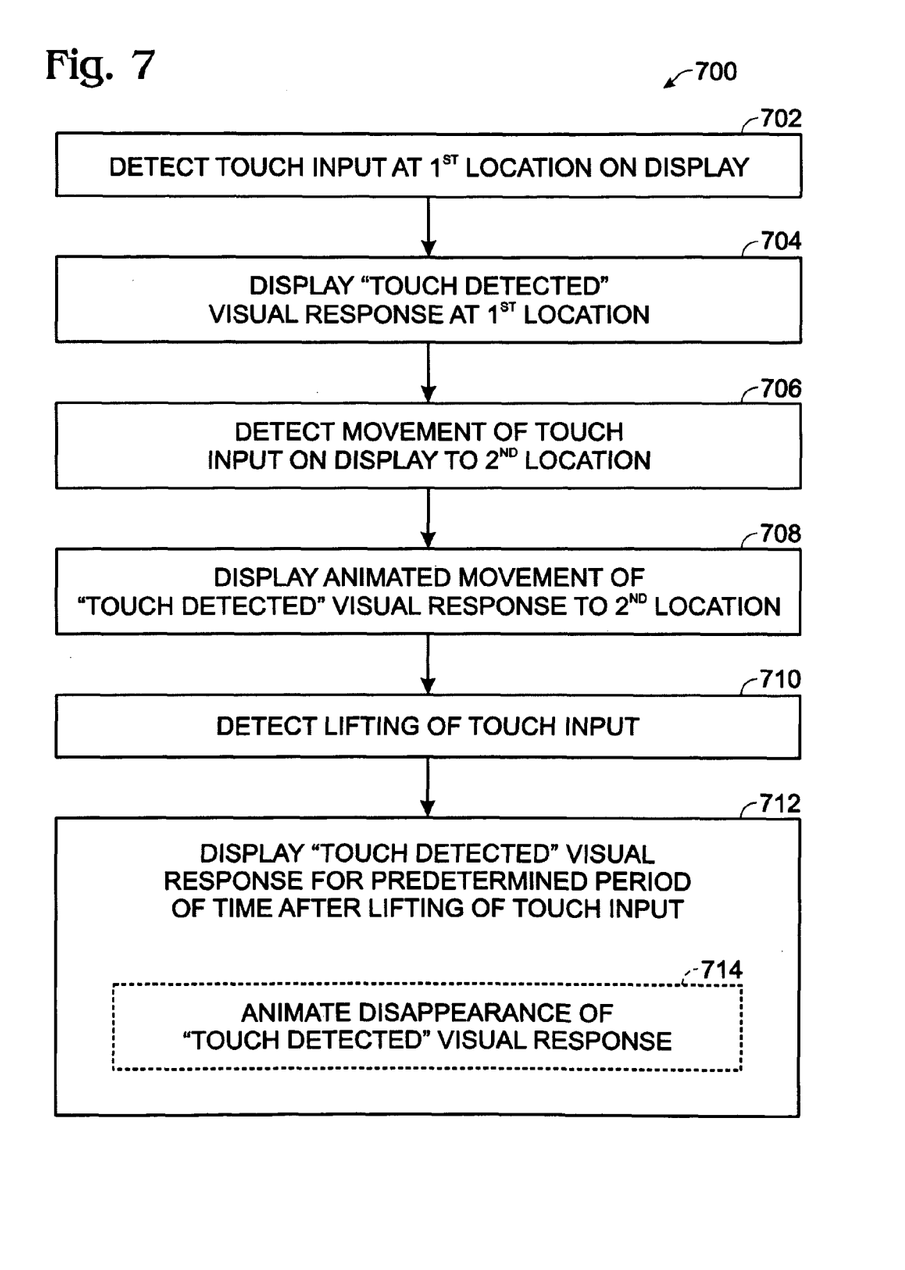
FIG. 7 shows another embodiment of a method of providing visual responses to touch inputs on a touch-sensitive display.

FIG. 7 shows a method 700 of providing visual responses to touch inputs that illustrates these two additional examples of visual responses to touch inputs. First, method 700 comprises detecting, at 702, a touch input at a first location on a touch-sensitive display, and then, at 704, displaying a "touch detected" visual response to the touch input. Next, method 700 comprises, at 706, detecting a movement of the touch input to a second location on the display. In response to detecting the movement of the touch input, method 700 comprises displaying, at 708, an animated movement of the "touch detected" visual response from the first location on the display to the second location on the display. In this manner, the visual impact of any lag caused by touch detection system latency may be reduced, and even made to be entertaining.

Next, method 700 comprises, at 710, detecting a lifting of a touch input. After detecting the lifting of the touch input, method 700 comprises, at 712, displaying the "touch detected" visual response for a predetermined period of time after the touch input is lifted. In this manner, a user may see where the location on the display at which the touch input was registered. This may help the user to modify the location of a subsequent touch input so that the subsequent touch input is registered at the correct target location. Further, as shown at 714, in some embodiments, the disappearance of the "touch detected" visual response may be animated (for example, by fading out) for additional visual impact.

Figure 8:
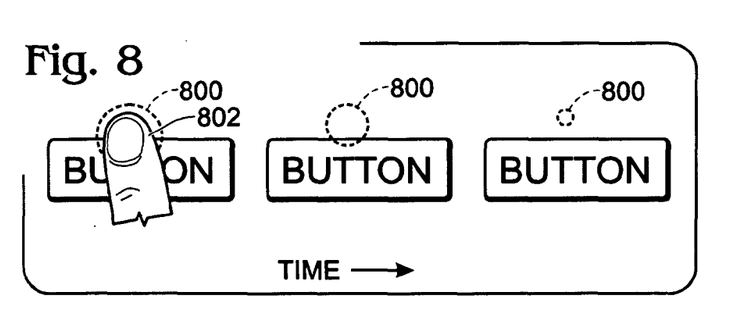
FIG. 8 shows an embodiment of an animated disappearance of a first visual response upon the lifting of a touch input
Figure 9:
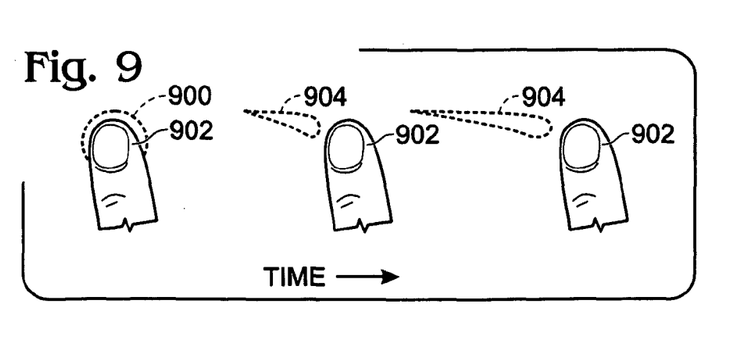
FIG. 9 shows an embodiment of an animated movement of a first visual response on a touch-sensitive display.

FIGS. 8 and 9 show examples of embodiments of the visual responses of FIG. 7. First, FIG. 8 illustrates an animated fading of an embodiment of a "touch detected" visual response 800 upon the lifting of a finger 802 from a display surface. As shown, the "touch detected" visual response converges over a period of time to a location at which the touch input was registered on the display, and in some embodiments, may converge to a single point. In this manner, the location at which the touch was registered on the display is the last thing seen by the user before the visual response completely fades away. In the depicted embodiment, the location at which the touch is registered is located adjacent to a tip of the user's finger, but it will be understood that a touch location may be registered to any other suitable location on the display relative to the object.

Next, FIG. 9 shows an example of an animated movement of a "touch detected" visual response from a first location on a display to a second location on a display. In the depicted embodiment, the "touch detected" visual response 900 converts to a comet-shaped object 904 with a tail that traces the path of motion of the user's finger 902. Upon reaching the second location, the comet-shaped object may revert to the ordinary appearance of the "touch detected" visual response. It will be understood that the depicted animation is shown and described for the purpose of example, and that any other suitable animation may be used. For example, the "touch detected" visual response 900 may convert to an animal that walks along behind the user's finger during movement of the finger, to a paper airplane that flies along behind the finger, etc. In this manner, any lag in movement that may be unpleasing to a user may be converted into an opportunity to entertain the user.

It will be appreciated that the interactive display device 100 disclosed herein is described for the purpose of example, and that the concepts disclosed herein may be used with any other suitable computing device with a touch-sensitive display. Examples of suitable computing devices include, but are not limited to a mainframe computer, personal computer, laptop computer, portable data assistant (PDA), computer-enabled wireless telephone, portable media player, smart phone, and/or any other suitable computing device, and/or combinations thereof. As mentioned above, such computing devices are configured to execute programs stored in non-volatile memory using portions of volatile memory and a processor and/or other logic subsystem components. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the configurations and/or approaches described herein for providing visual responses to touch inputs are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A computing device, comprising:
   a touch-sensitive display;
   a processor; and
   memory comprising instructions stored thereon that are executable by the processor to:
      detect a touch input made via the touch-sensitive display;
      display on the touch-sensitive display a first visual response to the touch input indicating that the touch input was detected by touch-sensitive display hardware, irrespective of whether the touch is made over a touch-interactive area of the display on which a touch-enabled user interface control is associated; and
      if the touch input is made over the touch-interactive area of the display with which the touch-enabled user interface control is associated and if the touch input is detected by an application controlled by the touch-enabled user interface control, then to determine if the touch input is captured by the touch-enabled user interface control in the touch-interactive area of the display,
      display a second visual response to the touch input comprising a "captured" visual response if the touch input is captured by the touch-enabled user interface control, and
      display a third visual response comprising an "uncaptured" visual response if the touch input is made in the touch-interactive area of the display but not captured by the touch-enabled user interface control.

2. The computing device of claim 1, wherein the instructions are executable to not display the second visual response if the touch input is made over an area of the touch-sensitive display with which the touch-enabled user interface control is not associated.

3. The computing device of claim 1, wherein the "captured" visual response comprises an animation converging toward a location of the touch input, and wherein the "uncaptured" visual response comprises an animation diverging from the location of the touch input.

4. The computing device of claim 1, wherein the "captured" visual response comprises a display of a first color, and the "uncaptured" visual response comprises a display of a second color.

5. The computing device of claim 1, wherein the first visual response comprises an illumination of a location beneath the touch input.

6. The computing device of claim 1, wherein the second visual response comprises an animation converging toward a location of the touch input.

7. The computing device of claim 1, wherein the instructions are further executable to display a "constraint notification" visual response if a touch input is received that is ignored due to a constraint.

8. The computing device of claim 7, wherein the touch-sensitive display comprises a multi-touch display, wherein the second visual response is a "captured" visual response that shows that the touch input was captured by the touch-enabled control displayed on the touch-sensitive display, and wherein the "constraint notification" visual response is displayed in response to an "overcaptured" touch state where a maximum number of touches recognized by the touch-enabled control is exceeded.

9. The computing device of claim 1, further comprising detecting a lifting of the touch input, and continuing displaying the first visual response for a pre-determined period of time after detecting the lifting of the touch input.

10. A computing device, comprising:
a multi-touch display;
a processor in operative communication with the multi-touch display; and
memory comprising instructions stored thereon that are executable by the processor to:
  detect a touch input made via the multi-touch display;
  display on the multi-touch display a "touch detected" visual response to the touch input indicating that the touch input was detected by touch-sensitive display hardware, irrespective of whether the touch is made in an area of the multi-touch display associated with a touch-enabled user interface control;
  if the touch input is made in an area of the multi-touch display associated with the touch-enabled control displayed on the multi-touch display and activates the touch-enabled control, then displaying a "captured" visual response to the touch input if the touch input is captured by the touch-enabled control, and displaying an "uncaptured" visual response to the touch input if the touch input is not captured by the touch-enabled control; and
  if the touch input is made in an area of the multi-touch display that is not touch-enabled, then not displaying the "captured" visual response or the "uncaptured" visual response.

11. The computing device of claim 10, wherein the "touch detected" visual response comprises an illumination of a location beneath the touch input.

12. The computing device of claim 10, wherein the "captured" visual response comprises an animation converging toward a location of the touch input.

13. The computing device of claim 10, wherein the "uncaptured" visual response comprises an animation diverging from a location of the touch input.

14. The computing device of claim 13, wherein the instructions are further executable to detect an additional touch that causes a plurality of touches in the area associated with the touch-enabled control to exceed a maximum number of recognized touches, and to display an "overcaptured" visual response in response.

15. The computing device of claim 10, wherein the instructions are executable to detect a movement of a touch from over the touch-enabled control to a location spaced from the control, and to display a visual response indicating that the touch remains captured by the control.

16. A computing device, comprising:
a touch-sensitive display;
a processor in operative communication with the touch-sensitive display; and
memory comprising instructions stored thereon that are executable by the processor to:
  detect a touch input made via the touch-sensitive display;
  display on the touch-sensitive display a first visual response to the touch input indicating that the touch input was detected by computing device hardware, irrespective of whether the touch is made in an area of the touch-sensitive display associated with a touch-enabled user interface control;
  detect a movement of the touch input on the touch-sensitive display from a first location to a second location;
  display on the touch-sensitive display an animated movement of the first visual response to move the first visual response from the first location to the second location; and
  if the touch input is made over a touch-interactive area of the display with which the touch-enabled user interface control is associated and if the touch input is detected by an application controlled by the touch-enabled user interface control, then display a second visual response to the touch input comprising a "captured" response indicating that the touch input is captured by the touch-enabled user interface control, and display a third visual response to the touch input comprising an "uncaptured" response if the touch input is made over the touch-interactive area of the display but is not captured by the touch-enabled user interface control.

17. The computing device of claim 16, wherein the animated movement comprises an animation of a tail extending along a path of movement of the first visual response.

18. The computing device of claim 16, wherein the first visual response comprises an illumination of a location beneath the touch input.

* * * * *